United States Patent [19]

Yoshimura et al.

[11] Patent Number: 4,913,718
[45] Date of Patent: Apr. 3, 1990

[54] MOLDING METHOD FOR OPTICAL ELEMENT AND APPARATUS THEREFOR

[75] Inventors: Fumitaka Yoshimura; Tomomasa Nakano, both of Yokohama; Isamu Shigyo, Chiba, all of Japan

[73] Assignee: Canon Kabushiki Kaisha, Tokyo, Japan

[21] Appl. No.: 272,321

[22] Filed: Nov. 17, 1988

[30] Foreign Application Priority Data

| Nov. 20, 1987 | [JP] | Japan | 62-292156 |
| Dec. 26, 1987 | [JP] | Japan | 62-330471 |
| Dec. 26, 1987 | [JP] | Japan | 62-330472 |
| Jan. 18, 1988 | [JP] | Japan | 63-006922 |
| Jan. 18, 1988 | [JP] | Japan | 63-006923 |
| Jan. 18, 1988 | [JP] | Japan | 63-006924 |
| Jan. 18, 1988 | [JP] | Japan | 63-003816[U] |
| Feb. 4, 1988 | [JP] | Japan | 63-022876 |
| Feb. 4, 1988 | [JP] | Japan | 63-022877 |

[51] Int. Cl.$^4$ ............................................. C03B 23/00
[52] U.S. Cl. ......................................... 65/104; 65/78; 65/102; 65/162; 65/275
[58] Field of Search ................... 65/102, 104, 162, 78, 65/275

[56] References Cited

U.S. PATENT DOCUMENTS

| 2,682,730 | 7/1954 | Rossen | 65/104 |
| 3,244,497 | 4/1966 | Copeland | 65/162 |
| 3,294,878 | 12/1966 | Carnall Jr. et al. | 264/1 |
| 3,402,226 | 9/1968 | Carnall Jr. et al. | 264/1 |
| 3,416,907 | 12/1968 | Carnall Jr. et al. | 65/32 |
| 3,833,347 | 9/1974 | Angle et al. | 65/32 |
| 3,844,755 | 10/1974 | Angle et al. | 65/32 |
| 3,900,328 | 8/1975 | Parsons et al. | 65/68 X |
| 4,104,046 | 8/1978 | McCreery | 65/162 X |
| 4,139,677 | 2/1979 | Blair et al. | 65/32 X |
| 4,168,961 | 9/1979 | Blair | 65/66 |
| 4,591,373 | 5/1986 | Sato | 65/29 |
| 4,606,750 | 8/1986 | Torii et al. | 65/374.13 |
| 4,629,487 | 12/1986 | Monji et al. | 65/26 |
| 4,629,489 | 12/1986 | Hirota et al. | 65/102 |

FOREIGN PATENT DOCUMENTS

| 56-378 | 1/1981 | Japan . |
| 60-239331 | 11/1985 | Japan . |
| 61-256929 | 11/1986 | Japan . |
| 62-191430 | 8/1987 | Japan . |

Primary Examiner—Arthur Kellogg
Attorney, Agent, or Firm—Fitzpatrick, Cella, Harper & Scinto

[57] ABSTRACT

Disclosed is a glass press molding method which comprises a step of heating glass material and a mold die composed at least of an upper mold die and a lower mold die for molding the glass material;

a step of pressing the glass material by means of the mold die;

plural pallets for supporting the glass material and the mold die, each of the pallet supporting the glass material and the mold die in independent manner;

a step of transporting, in succession, the pallets each supporting the glass material and the mold die; and a step of transferring the glass material, prior to the pressing step, in such a manner as to place the glass material, heated to a predetermined temperature in the heating step, between the lower mold die and the upper mold die, and to transfer the pallet with the glass material inserted in the mold die to the pressing step.

18 Claims, 16 Drawing Sheets

MOLDING METHOD FOR OPTICAL ELEMENT AND APPARATUS THEREFOR

BACKGROUND OF THE INVENTION

1. Field of the Invention

The present invention relates to a technology for press molding of preliminary molded or unmolded glass material with a mold die.

2. Related Background Art

Technologies for obtaining molded articles by press molding, with a mold die, of glass material softened by heating is already known for a long time for example from the U.S. Pat. Nos. 3,244,497, 3,294,878, 3,402,226 and 3,416,907, etc.

Also the method and apparatus for press molding with a mold die after heating of glass material were disclosed in the U.S. Pat. Nos. 3,833,347, 3,844,755, 3,900,328, 4,139,677 and 4,168,961.

Besides, in the field of technology related to the present invention, there were recently issued U.S. Pat. No. 4,591,373, 4,606,750, 4,629,487 and 4,629,489.

Also among the Japanese Laid-open and Published patents, the Japanese Patent Publication No. 56-378 discloses a method of heating glass material on a mold die and then molding the glass by pressing in said mold die. Also, the Japanese Laid-open Patent No. 60-239331 discloses an apparatus in which a lower mold die (7) is placed on a support carriage (6), and plural carriage (6) are mutually linked and guided, by means of a conveyor belt (4) to a molding furnace (8) consisting of a heating chamber (9), a molding changer (11) and a slow cooling chamber (12). Furthermore the Japanese Laid-open Patent No. 61-256929 and No. 62-191430 disclose an apparatus in which optical material is placed on a carrier and transported by transport means to a heating step and a pressing step for press molding.

SUMMARY OF THE INVENTION

An object of the present invention is to provide a method for forming an optical functional face of an optical element by press molding with a mold die by heating glass material which is subjected to preliminary molding or which is not subjected to such preliminary molding, for example is a rough ground state, said method being capable of precise molding of the form of optical element, particularly the optical functional face thereof, from the glass material.

The technology of the present invention for forming an optical element from glass material by glass press molding is suitable for the manufacture of lenses for use in various optical systems such as of cameras, optical instruments or the like, as will be apparent from the above-cited and other prior references of glass press molding. It is expected particularly effective in the manufacture of aspherical lenses. However conventional glass press molding has not been possible to manufacture the lenses with a high efficiency, namely with a high quality and a low cost.

Thus, a first object of the present invention is to provide a manufacturing method, and an apparatus therefor, for heating the glass material to a temperature suitable for molding through a heating step, passing a mold die through a heating step same as that for said glass material thereby heating the glass material and the mold die at the same time but separately, and transferring the glass material into said mold die prior to the press molding in such a manner that the glass material and the mold reach an optimum condition at the press molding.

Another object of the present invention is to provide a manufacturing method, and an apparatus therefor, for simultaneously and independently heating the glass material and the mold die in a same heating step, and, for the purpose of obtaining the molded articles in continuous manner through the heating and press molding steps, placing the glass material and the mold die for press molding said glass material on a same pallette and transporting such pallettes supporting the glass materials and the mold dies through the heating step and press molding step in continuous manner.

It has however become apparent that, in such continuous supply of the glass materials and the mold dies on pallettes, the temperature of the glass material and the mold die becomes different from the predetermined value due to heat conduction from the neighboring pallette.

A second object of the present invention, therefore, is to provide a method for preventing heat transmission between neighboring pallettes and a pallette structure suitable therefor.

In the press molding of glass material at a high temperature, it is extremely important, in relation to the glass composition, to inspect whether the glass material is heated to a predetermined temperature at the press molding. However, it is difficult to measure the temperature by direct contact of a detecting terminal with the glass material and/or the mold die. Conventionally the temperature of the glass material is measured by the temperature measurement of the atmosphere in the heating furnace.

Another object of the present invention, therefore, is to provide a method, and an apparatus therefor, for measuring the temperature of the glass material and the mold die through the pallette during the transportation of the glass material and the mold die on the pallette through the heating step, thereby enabling precise measurement of the temperature.

In the apparatus for transporting the pallettes in succession with the glass materials and the mold dies thereon, said pallettes and the rails or the like for transporting said pallettes also assume a high temperature when the glass materials and the mold dies are heated. The supply of the mold die housing the glass material therein to the position of press molding becomes difficult due to this phenomenon.

Still another object of the present invention, therefore, is to provide an apparatus provided with position regulating means for the pallette in order that the pallette reaches the exact position for press molding.

Still another object of the present invention is to provide an apparatus in which the above-mentioned pallette is continuously transported through a heating step, a pressing step, a cooling step and a product removing step, required for the manufacture of an optical element by heating and press molding of the glass material.

DETAILED DESCRIPTION OF THE PREFERRED EMBODIMENTS

Now the present invention will be clarified in detail by embodiments thereof shown in the attached drawings.

Figure 1A:
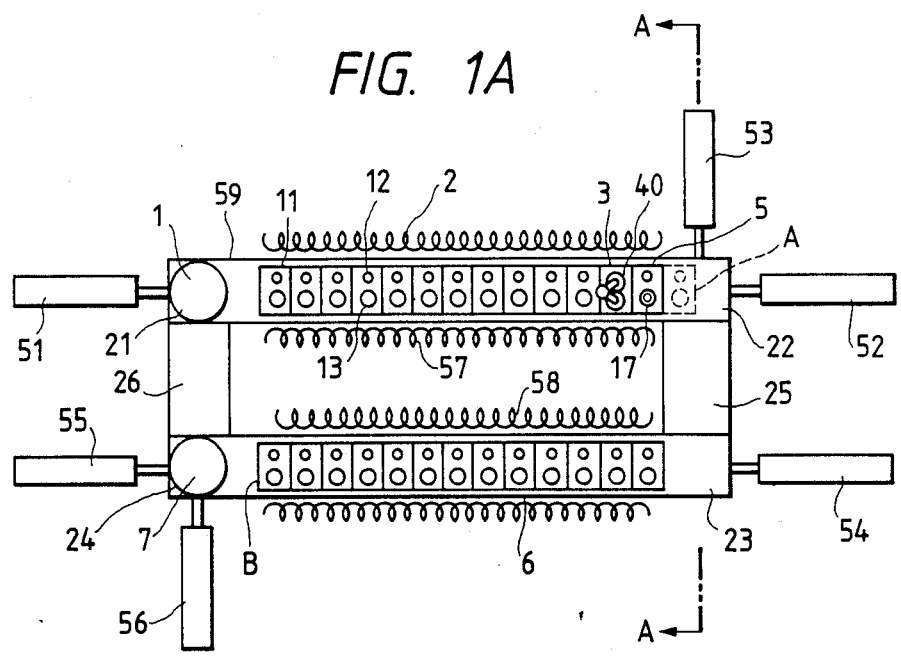
FIG. 1A is an entire schematic view of an apparatus for executing the method of the present invention for producing optical element.
Figure 1B:
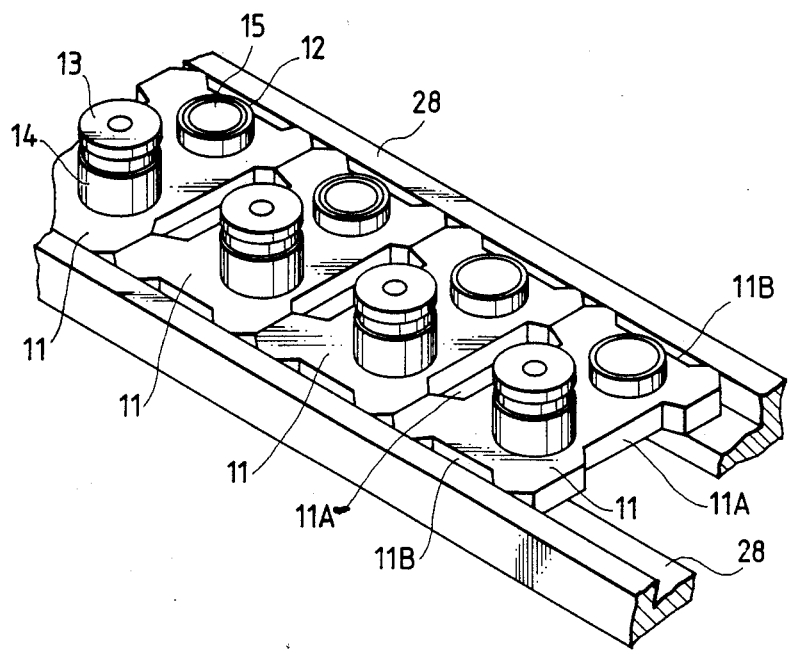
FIG. 1B is a view showing the step of pallettes 11 continuously transported on guide rails 28, 28 in the course of molding step.
Figure 7:
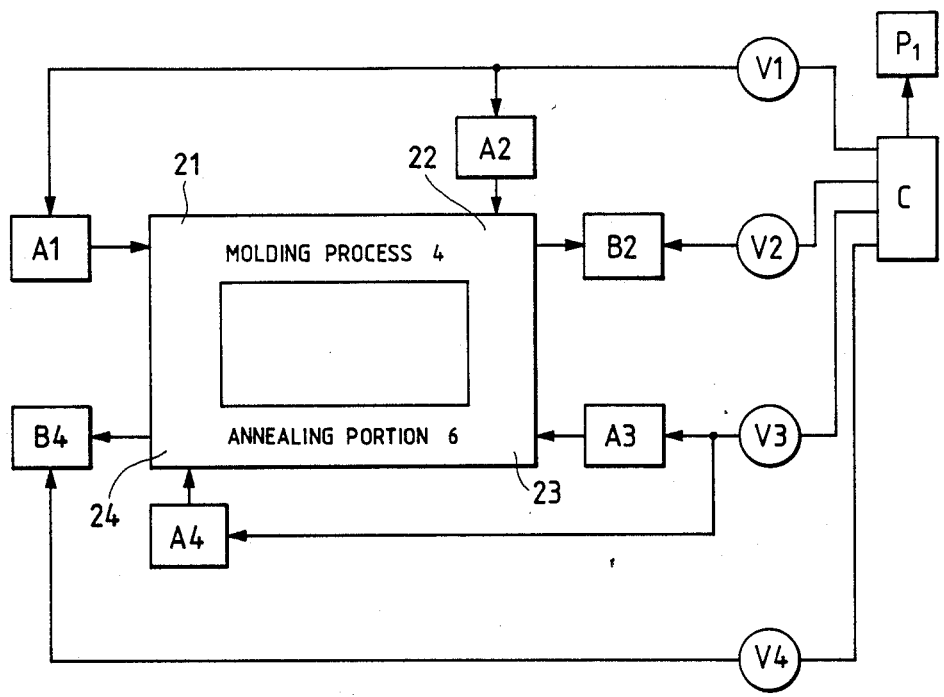
FIG. 7 is a schematic view showing the function of cylinders shown in FIG. 1A.
Figure 8:
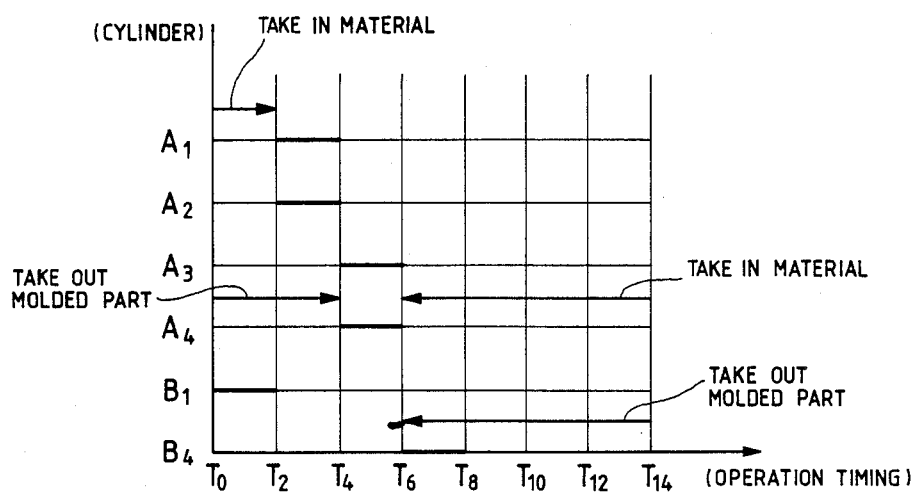
FIG. 8 is a timing chart of cylinders shown in FIG. 7.
Figure 9:
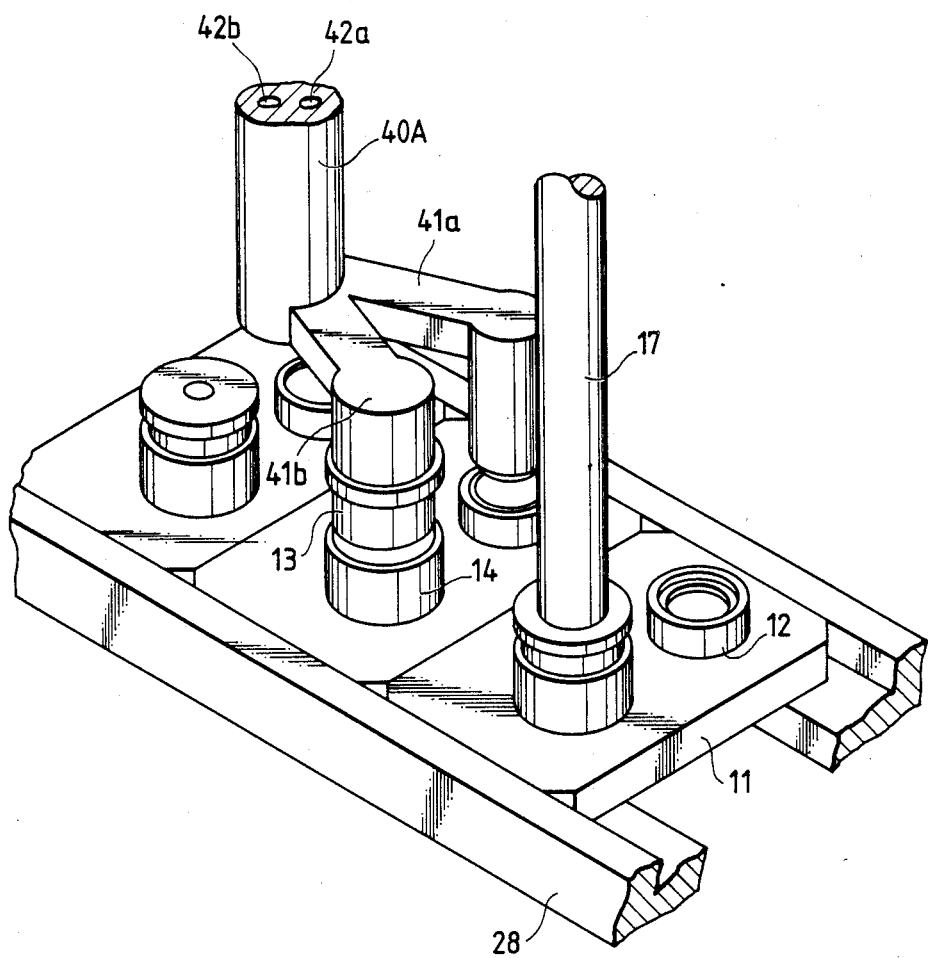
FIG. 9 is a schematic view of transfer means.
Figure 10A:
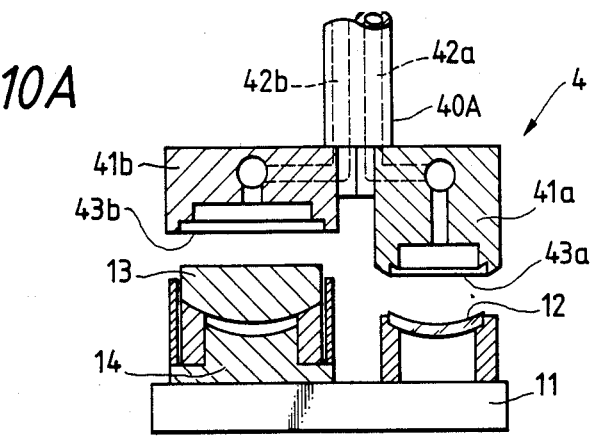
FIGS. 10A to 10G are schematic views showing the function of transfer means.

FIGS. 1A and 1B are schematic entire plan views of an apparatus of the present invention; FIGS. 2 to 6 are cross-sectional views of various parts of the apparatus; FIG. 7 is a view around the material transport path; FIG. 8 is a chart showing the function timing of cylinders; FIG. 9 is a perspective view around the material transport means; FIGS. 10A to 10G are schematic cross-sectional views showing the function of the transport means shown in FIG. 9; and FIG. 11 is a chart showing the function timing of the transfer means.

As shown in FIG. 1A, the apparatus is principally composed of a material intake chamber 1; a heating portion 2; a material transfer portion 3; a pressing portion 5; an annealing portion 6 and a molded product outtake chamber 7. The material intake chamber 1, heating portion 2, material transfer portion 3 and pressing portion 5 are positioned on a same line, and the annealing portion 6 is positioned parallel thereto.

In the vicinity of the entrance of the heating portion 2 there is formed a first transfer chamber 21, in which the above-mentioned material intake chamber 1 is formed. In the vicinity of the exit of the pressing portion 5 there is formed a second transfer chamber 22, while, at the entrance of the annealing portion 6 there is formed a third transfer chamber 23, and said second and third transfer chambers are connected to a transfer path 25. Besides, in the vicinity of the exit of the annealing portion 6 there is formed a fourth transfer chamber 24, in which said material take-out chamber 7, and said fourth transfer chamber 24 and the above-mentioned first transfer chamber 21 are connected by a return path 26. These chambers and portions constitute a molding chamber 59 forming a circulating path, which is provided with a heater 57 for heating the heating portion 2, material transfer portion 3 and pressing portion 5 and another heater 58 for heating the annealing portion 6.

Palletes 11 transported in the above-mentioned molding chamber are preferably composed of SUS 303 or SUS 304 excellent in thermal conductivity and thermal resistance. Four external faces of said pallet are respectively provided notches 11A, 11A, 11B, 11B (FIG. 1B), said notches being of same sizes and of same positions in all the pallets 11. On each pallet 11 there are provided a material support 12 and upper and lower mold dies 13, 14 for press molding with a predetermined distance therebetween, and said upper and lower mold dies 13, 14 are respectively provided with mirror-finished faces 13, 14a for forming the functional faces of the optical element.

As shown in FIG. 1B, plural pallets 11 are placed guide rails 28, 28 provided in the molding chamber 59, and move on said guide rails 2, 28 in mutually contacted state by the function of a cylinder 51 to be described later.

In comparison with the conventional pallet with flat external faces, the above-explained pallet 11 has a significantly smaller contact area with neighboring pallets or with the guide rails, and is therefore less influenced by thermal transfer from other members. Consequently the pallet 11 itself, and the upper and lower mold dies 13, 14 and the material support member 12 provided thereon, suffer less from the uneven heat distribution.

In the first transfer chamber 21 there is provided a first pushing cylinder 51 (A1) for moving the pallets 11 into the pressing zone 5. In the second transfer chamber 22 there are provided a pulling cylinder 52 (B2) and a second pushing cylinder 53 (A2). The pulling cylinder pulls the pallets 11 from the pressing zone 5 to the second transfer chamber 22, while the pushing cylinder 53 pushes the pallet 11, moved to said second transfer chamber, to the third transfer chamber 23. In said third transfer chamber 23 there is provided a third pushing cylinder 54 (A3), which pushes the pallet 11, transferred to said third transfer chamber 23, to a position immediately before the fourth transfer chamber 24. In said fourth transfer chamber 24 there are provided a pulling cylinder 55 (B4) and a fourth pushing cylinder 56 (A4). The pulling cylinder 55 pulls the pallet 11, moved to a position immediately before the fourth transfer chamber 24, to said fourth transfer chamber, and the pushing cylinder 56 pushes the pallet 11 again to the first transfer chamber 21. In this manner the pallet 11 is transported through different zones through the molding chamber 59, by the pushing and pulling operations of these cylinders.

In the following there will be explained the structure of the pulling cylinder 52 positioned close to the material transfer zone 3 and the pressing zone 5, with reference to FIGS. 1C to 1E.

A piston rod 52a of the pulling cylinder 52 is provided, at the front end thereof, with an engaging member 52b, and said pulling cylinder 52 is constructed in such a manner that said piston rod 52a performs a rotating motion in combination with the reciprocating motion thereof. Thus the extraction of the pallet 11 after the press molding to the transfer chamber 22 by the pulling cylinder 52 is achieved by rotating the piston rod 52a to a lateral position of the engaging member 52b, then moving the piston rod in a direction opposite to the pulling direction below the pallet 11 present in the pressing zone 5 until the engaging member 52b reaches a gap between said pallet 11 in the pressing zone 5 and a neighboring pallet 22, then rotating the piston rod 52a until the engaging member 25b reaches an upright position thereby engaging with a lateral face of the pallet 11, and moving the piston rod 52a in the pulling direction.

In the following there will be described the aligning operation of the pallets 11 by the above-described pulling cylinder 52, with reference to FIG. 1E.

Figure 1C:
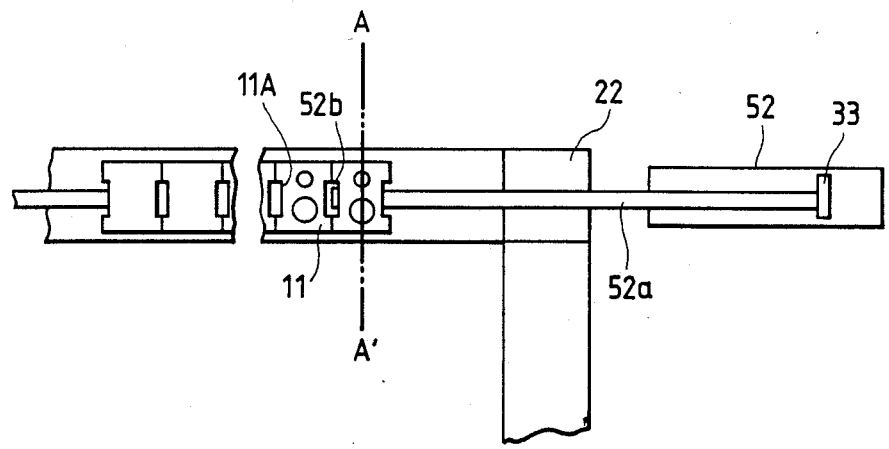
FIGS. 1C to 1E are schematic views showing the position regulation of the pallette at the pressing position.
Figure 1D:
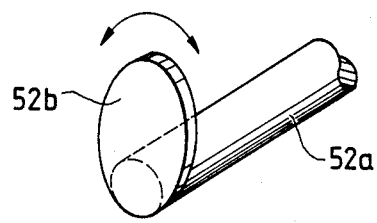
Figure 1E:
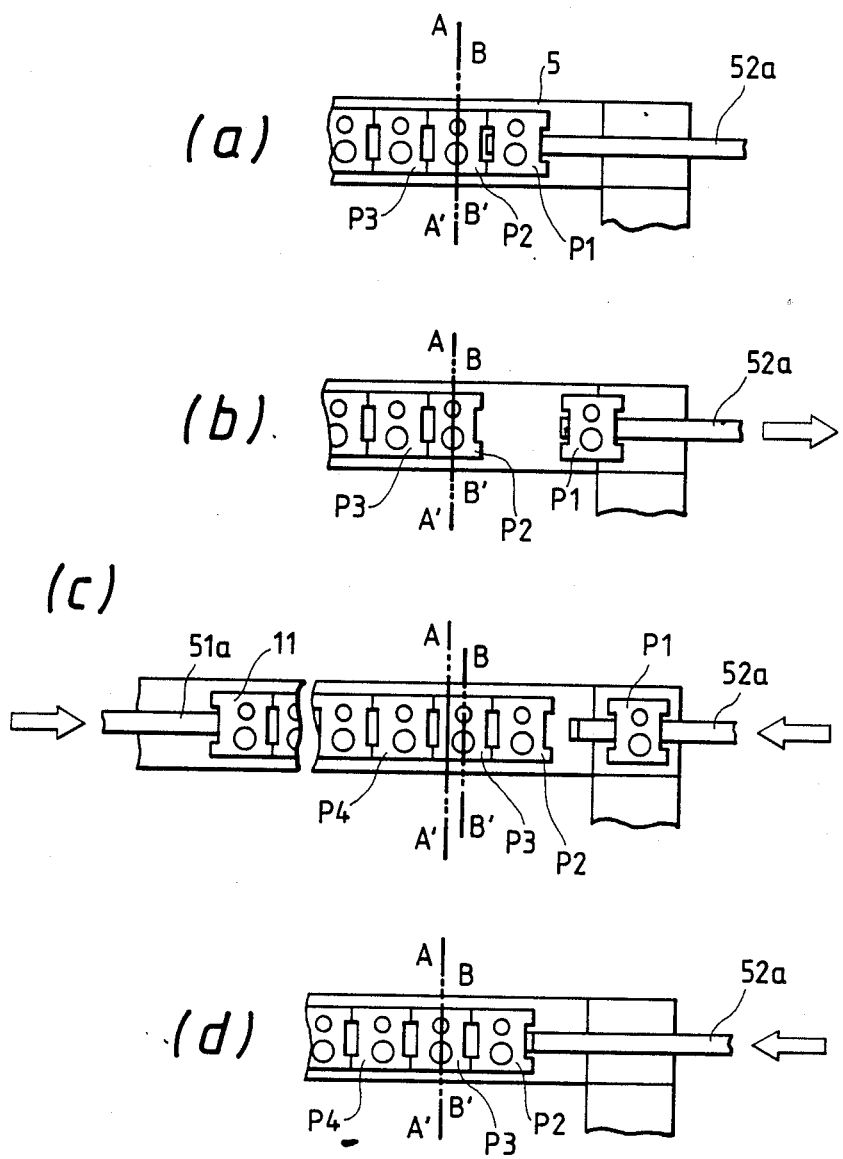

In FIG. 1E a line A—A' indicates the center of transfer position in the transfer zone 3, corresponding for example to the center of an automatic hand in case the material transfer operation is conducted with such automatic hand. Also a line B—B' indicates the center of the pallet 11, corresponding to a line connecting the centers of the material support member 12 and the lower mold die 14 both placed on said pallet 11.

In FIG. 1E, a pallet present in the pressing zone shall be called P1, while another pallet present in the transfer zone 3 shall be called P2, and a succeeding pallet shall be called P3.

After the press molding, the engaging member 25b of the piston rod 52a is made to engage with the notch 11A on the rear lateral face of the pallet P1 by the above-described operation (FIG. 1E(a)), and said pallet is moved in the pulling direction (FIG. 1E(b)). In this state, the transfer of the material 15 in the material transfer zone 3 is assumed to have been completed. After the pulled pallet P1 reaches the transfer chamber 22, the piston rod 51a of the pushing cylinder 51 is extended, against the lateral face of the rearmost pallet 11 in the molding line 4. In this manner plural pallets from the rearmost one in the molding line 4 to the one P2 in the material transfer zone 3 are pushed forward simultaneously, whereby the frontmost pallet P2, for which the transfer of material has been completed, moves to the pressing zone and the succeeding pallet P3 proceeds to the material transfer zone 3. In this state, as shown in FIG. 1E(c), the center B—B' of the pallet P3 which has moved to the material transfer zone 3 does not coincide with the center A—A' thereof, due to the thermal expansion in each of the pallets from the rearmost one in the molding line 4 to the frontmost pallet P3. In order to avoid such error the piston rod 52a of the pulling cylinder 52 is rotated until the engaging member 52b assumed an upright position, and is moved by a predetermined stroke, in a direction opposite to the pulling direction, against the front lateral face of the pallet P2, whereby the pallet P3 is aligned with the predetermined material transfer position. For effecting such aligning operation, the stroke of said cylinder 52 in the direction opposite to the pulling direction is adjusted in such a manner that the center B—B of the pallet in the material transfer position coincides with the center A—A' of the automatic hand.

The above-described aligning operation enables precise positioning of the pallet P3, because there is only one pallet P2 between the pallet P3 and the piston rod of the pulling cylinder 52 and the thermal expansion of said pallet P2 exerts only negligible influence.

Figure 12:
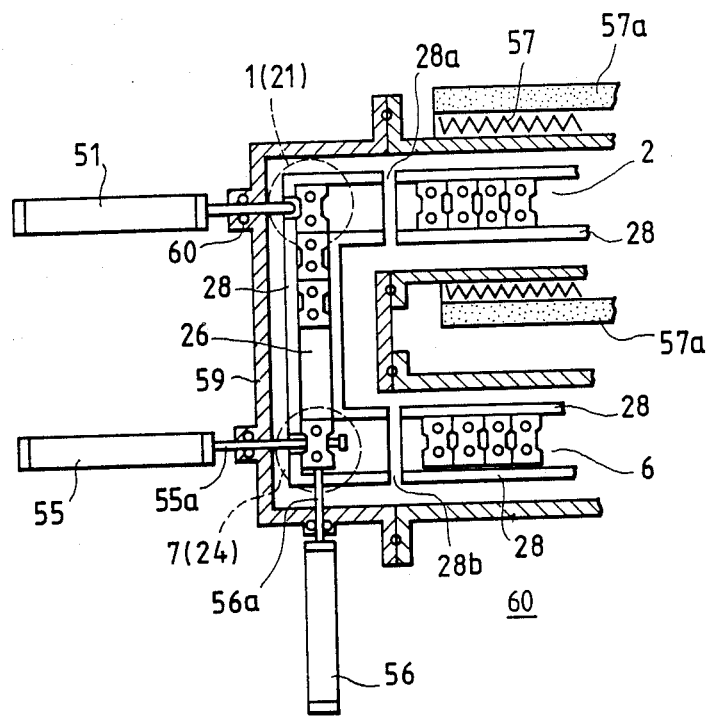
FIG. 12 is a partial plan view of a transport path.
Figure 13A:
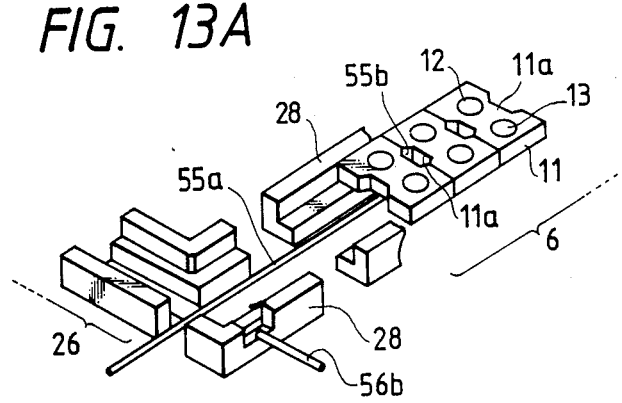
FIGS. 13A to 13E are schematic view showing the pallette movement in said transport path.
Figure 13B:
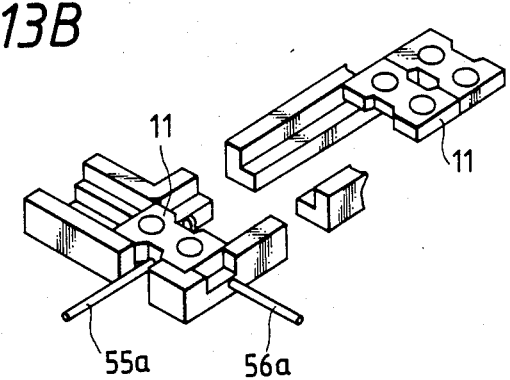
Figure 13C:
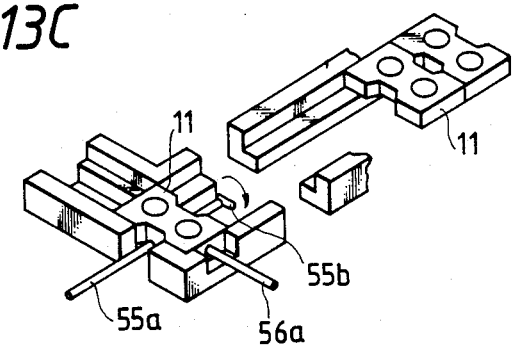
Figure 13D:
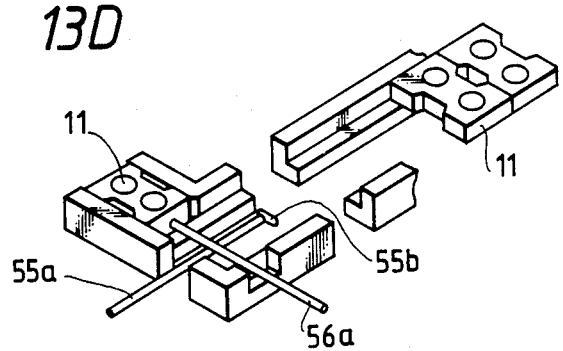
Figure 13E:
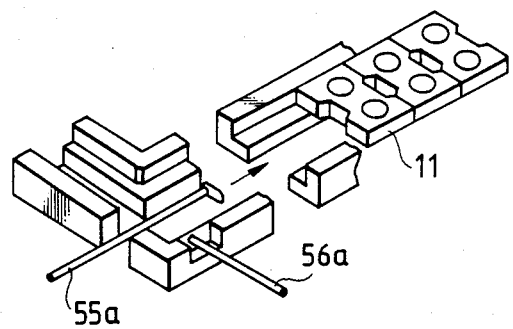

In the following there will be described the structure of the return path 26 with reference to FIGS. 12 and 13A to 13E, which are respectively a schematic plan view of said return path 26 and perspective view showing the transfer of the pallet 11 in the fourth transfer chamber 24 shown in FIG. 12.

In order to reduce the influence of thermal expansion of the guide rails 28, there are formed discontinuations 28a, 28b respectively in the vicinity of the heating zone 2 and the first transfer chamber 21, and in the vicinity of the annealing zone 6 and the fourth transfer chamber 24.

Seals 60 are provided in the sliding portions of the above-described pushing and pulling cylinders 51, 55, 56 in order to maintain inert gas atmosphere in the molding chamber 59.

In FIGS. 13A–13E, a cylinder rod 55a of the cylinder 56 is positioned below a cylinder rod 56a of the cylinder 56 so that they can cross each other. An engaging member 55b is provided on the front end of the rod 55a. The extraction of the pallet 11 from the annealing chamber 6 is achieved by moving the front end of the rod 55a to a gap between the frontmost pallet 11 in the annealing zone 6 and the succeeding pallet, rotating the rod 55a to insert the engaging member 55b into the notch 11A of the frontmost pallet 11 and activating the cylinder 55 while the engaging member 55b engages with said notch 11A, whereby the pallet 11 is pulled to the fourth transfer chamber 24. After the removal of the molded product 18, the pushing cylinder 56 is activated with the front end of the piston rod 56a thereof against the lateral face of the pallet 11, to the end of the return path, namely to the first transfer chamber 21. For the purpose of simplicity, the sliding portions between the piston rods and the molding chamber 59 are shown in abbreviated manner in FIGS. 13A–13E, and the upper and lower mold dies 13, 14 and the material support member 12 on each pallet are omitted.

In the following there will be described the function timing of the pushing and pulling cylinders, with reference to FIGS. 7 and 8.

FIG. 7 is a schematic view of the present embodiment, wherein shown are pushing and pulling cylinders A1–A4, B2, B4; pressure regulating valves V1–V4 connected to a controller C and serving to regulate the pressure in the above-mentioned cylinders; and control signals C1–C4 sent to said valves. In a timing chart shown in FIG. 8, the ordinate indicate said cylinders A1–A4, B2 and B4, while the abscissa indicate the periods of activation of said cylinders.

Pallets 11 of a desired number are placed in the molding zone 4 and the annealing zone 6 of the molding chamber 59. For the purpose of simplicity, it is assumed that the glass material 15 is suitably supplied in each of the pallets, and the transfer of glass material and the press molding operation will be described later.

At first, the pulling cylinder 52 (B2) is activated to move a pallet 11, which has been subjected to a press molding operation in the pressing zone 5, to the second transfer chamber 22 (T0–T2). Then the pushing cylinder 51 (A1) is activated to move the frontmost pallet 11 in the molding zone 4 to the pressing zone 5, and simultaneously the pushing cylinder 53 (A2) is activated to move the pallet 11, which has been moved to the second transfer chamber 22, to the third transfer chamber 23 (T2–T4). The simultaneous activation of the pushing cylinders 51, 53 (A1, A2) enables rapid tranfer of the molded product 18 to the annealing zone 6, thereby reducing the entire production cycle time. Also the second transfer chamber 22 is evacuated, in preparation for the next pulling operation of the pulling cylinder 52 (B2).

Then the pushing cylinder 54 (A3) pushes the pallet, which has been moved to the third transfer chamber 23, toward the fourth transfer chamber 24, whereby the foremost one of the pallets 11 present in the annealing zone 6 is moved to a position immediately before the fourth transfer chamber 24 (T4–T6). Simultaneously the pushing cylinder 56 (A4) is activated to move a pallet 11, which has been moved to the fourth transfer chamber 24, to the first transfer chamber 21 (T4–T6).

Subsequently the pulling cylinder 55 (B4) is activated to pull the foremost pallet 11, which has been moved to a position immediately before the fourth transfer chamber 24, to said chamber 24 (T6–T8).

The simultaneous activation of the pushing cylinders 54, 55 (A3, A4) enables to evacuate the fourth transfer chamber and enables the prompt activation of the pulling cylinder 55, thereby reducing the period of sojourn of the molded product in the annealing zone 6 and reducing to the entire production cycle time.

The molded product 18 is taken out in a period after the extraction of the leading pallet 11 of the annealing zone 6 into the fourth transfer chamber 24 by the pulling cylinder 55 (B4) until the pushing operation by the pushing cylinder 56 (A4), namely in a period from T8 to T4. The glass material is taken in during a period after the transfer of said pallet to the first transfer chamber 21 by the pushing cylinder 56 (A4) and until the pushing operation of the pushing cylinder 51 (A1), namely in a period from T6 to T2.

In the following there will be explained an embodiment of the transfer operation of the glass material 15 heated in the heating zone 2, with reference to FIGS. 9, 10A–10G and 11.

FIG. 9 illustrates an automatic hand 40 as the glass transfer means in the present embodiment. Said automatic hand is provided with an arm 40A rendered slidable through the furnace body in the material transfer zone 3 between the heating zone 2 and the pressing zone 5, and two fingers 41a, 41b fixed to the lower end of said arm. Said fingers 41a, 41b are respectively provided with suction faces 43a, 43b positioned corresponding to the material support member 12 and the upper and lower mold dies 13, 14 present on the pallet with a predetermined distance therebetween. In the interior of the arm 40A there are provided two suction holes 42a, 42b which are respectively extended to the suction faces 43a, 43b according to the branching of the fingers. Said suction holes 42a, 42b are connected to a vacuum source P1 which is shown in FIG. 7 and controlled by the controller C. A finger 41a is used for lifting the glass material 15 by suction, while the other finger 41b is used for lifting the upper mold die 13. The arm 40A is connected to unrepresented driving cylinder and motor, provided outside the molding chamber 59, and is vertically moved by said cylinder and rotated by said motor. The above-mentioned vacuum source, driving cylinder and motor are connected to the controller and are controlled according to the operation timing to be described later.

Among the above-mentioned suction faces, at least the suction face 43a of the finger 41a, used for lifting the heated glass material 15, is preferably made of a material resistant to sticking by fusion, such as molybdenum. Also a sealant has to be provided in the sliding portion between the arm 40A and the molding chamber 59, in order to maintain the hermeticity therein.

In the following there will be explained the function of the above-described automatic hand, with reference to FIGS. 10A to 10G which are cross-sectional views showing the function of said automatic hand. Also in the following description, reference is made to a timing chart of the automatic hand 40 shown in FIG. 8, and the function timings (T0–T14) of the pushing and pulling cylinders shown in FIG. 8.

At first the glass material 15 and the upper mold die 13 supplied in the intake chamber 1 are respectively placed on the support member 12 and the lower mold die on the pallet, and said pallet is transferred by the pushing operations of the cylinder 51 through the heating zone 2 for heating to a predetermined pressing temperature. Then said pallet is moved to the material transfer zone 3. FIG. 10A shows this state, in which the upper mold die 13 and the material support member 12 are positioned opposed to the suction faces 43a, 43b of the fingers 41a, 41b.

Figure 10B:
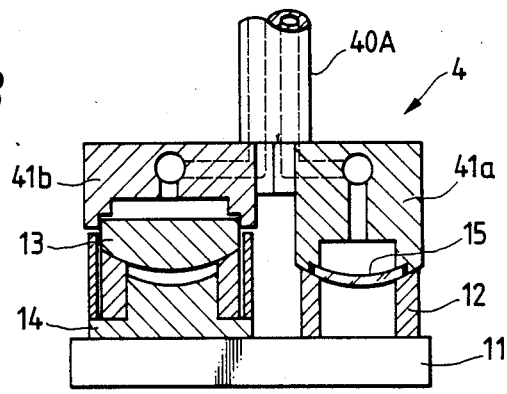
Figure 10C:
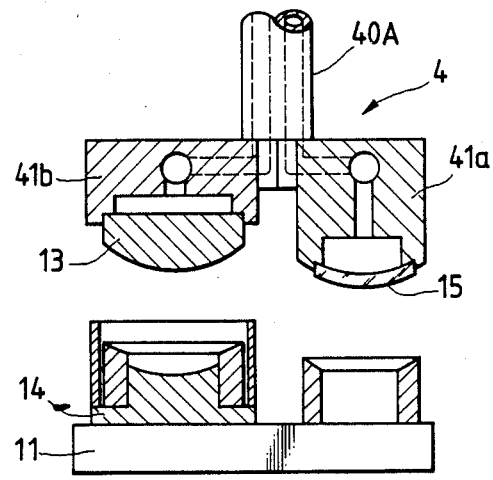
Figure 10D:
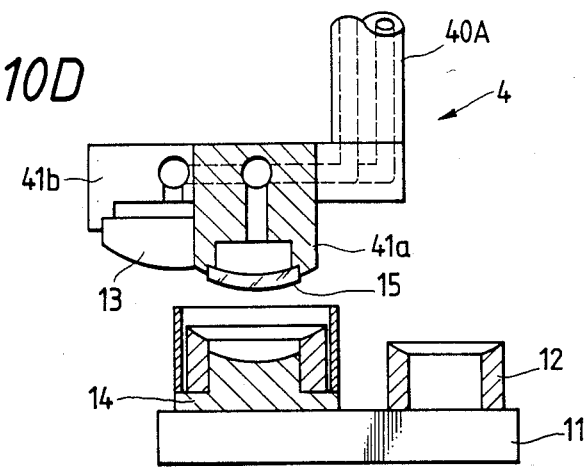
Figure 10E:
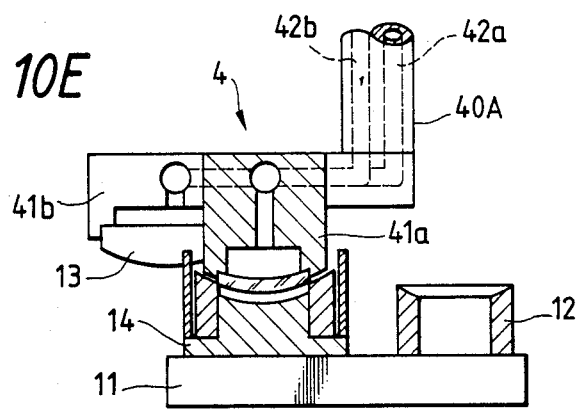
Figure 10F:
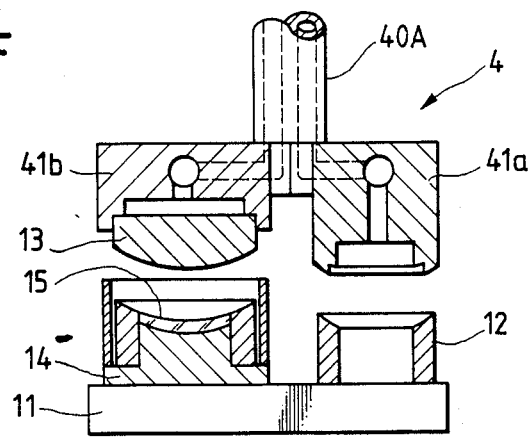
Figure 10G:
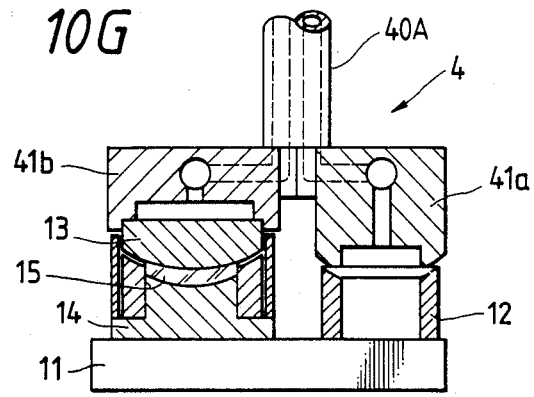
Figure 11:
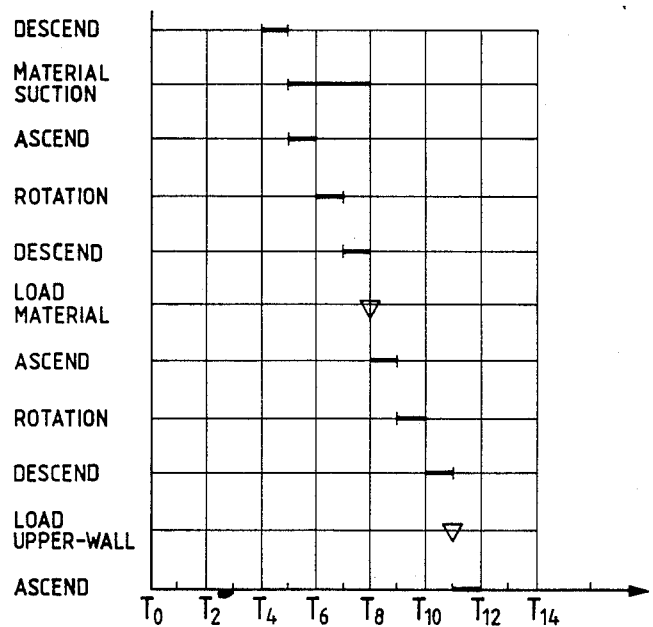
FIG. 11 is a timing chart of the function of the transfer means.

As shown in FIG. 10B, the automatic hand 40 is lowered by the unrepresented cylinder until the suction faces 43a, 43b respectively come close to the upper mold die 13 and the glass material 15 (T4–T5). Then as shown in FIG. 10B, the upper mold die 13 and the glass material 15 are simultaneously adhered by suction from the vacuum source P1 (T5) and the automatic hand 40 is lifted (T5–T6). The lower mold die 14 is therefore left open in this state. Then the automatic hand 40 is rotated, as shown in FIG. 10D until the glass material 15 adhered to the finger 41a is positioned above the lower mold die 14 (T6–T7). The automatic hand 40 is then lowered, as shown in FIG. 10E to bring the glass material 15 close to the lower mold die 14 (T7–T8), and the suction of the finger 41a is terminated to place said material 15 on the lower mold die 14 (T8). In this state the upper mold die is still adhered to the finger 41b. Then, as shown in FIG. 10F, the automatic hand 40 is again lifted (T8–T9) and is returned to the original state in which the upper mold die adhered to the finger 41b is positioned above the lower mold die (T9–T10). Subsequently the automatic hand 40 is lowered (T10–T11), and the suction is terminated to place the upper mold die 13 on the lower mold die 14 (T11) thereby placing the glass material between the upper and lower mold dies 13, 14 are shown in FIG. 10F. In this manner completed is the operation for transferring the heated glass material 15 from the support member 12 to the interior of the upper and lower mold dies. After the automatic hand 40 is again lifted (T11–T12), the pallet 11 is moved by the cylinder 51 to the pressing zone for press molding.

In the following there will be described various units of the molding chamber 59.

Figure 6:
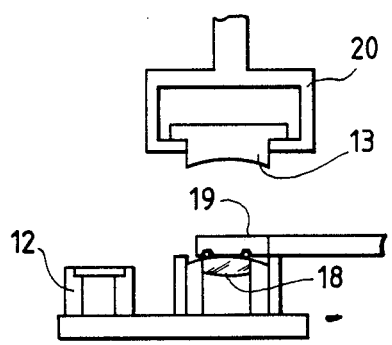

In each of the material intake chamber 1 and the molded product take-out chamber 7, there are provided, as shown in FIG. 6, a lifting hand 20 for lifting the upper mold die 13, and an automatic hand 19 for placing the material 15 or removing the molded product 18 after the upper mold die 13 is lifted.

In the present embodiment, the interior of the molding chamber 59 has to be evacuated and filled with non-oxidizing gas such as nitrogen gas in order to maintain inert gas atmosphere for preventing the oxidation of the material constituting the upper mold die 13 and lower mold die 14 under a high temperature. Also for maintaining the hermeticity of the molding chamber, sufficient seals are provided in the sliding portions between said lifting hand 20, automatic hands 16, 19, pressing rod 17 etc. and the external wall of said molding chamber.

In the following there will be explained the function in each process step of the above-described apparatus, with reference to the entire plan view shown in FIG.

Figure 2:
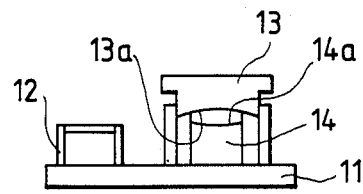
FIGS. 2 to 6 are schematic cross-sectional views of the pallette in various steps.

1A and illustrations of the press molding steps shown in FIGS. 2 to 6. FIG. 2 shows the pallet 11 without the glass material 15.

At first, for the purpose of preventing oxidation of the material constituting the upper and lower mold dies 13, 14, the interior of the molding chamber 59 is evacuated to a pressure $1 \times 10^{-2}$ Torr by means of an unrepresented vacuum pump, and is filled with nitrogen gas or other non-oxidative gas.

Figure 3:
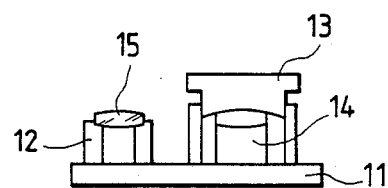

Then heaters 57, 58 are energized to elevate the temperature in the furnace to a predetermined value. After the completion of heating, the glass material 15 is placed on the support member 12 of the pallet 11 present in the material intake chamber 1, by means of the automatic hand, through an atmosphere replacing chamber (FIG. 3).

Figure 4:
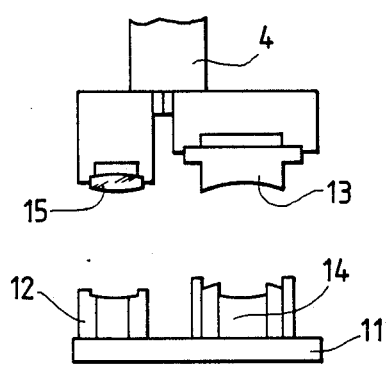

The pushing cylinders 51, 53, 54, 55 and the pulling cylinders 52, 56 are activated to place the glass material 15 on the support member 12 each time a pallet 11 is sent from the molded product take-out chamber 7 to the material intake chamber 1. The above-described operation is thereafter repeated, and, the transfer of the glass material 15 onto the lower mold die 14 is conducted when the material 15 and the upper and lower mold dies 13, 14 on the first pallet 11 are heated to a temperature necessary for press molding in the vicinity of the material transfer zone 3. In this state it is desirable that the material 15 and the upper and lower mold dies 13, 14 are heated to a substantially same temperature. In this manner the temperature of the material 15 after the material transfer is not affected by the temperature of the upper or lower mold die 13, 14, and the press molding can conducted under an optimum temperature condition. Then, in the material transfer zone 3, the upper mold die 13 is lifted by the automatic hand, and the glass material 15 is transferred onto the lower mold die 14. Subsequently the pushing cylinder 51 is activated to move the pallet 11, for which the transfer of the material 15 has been completed, to the pressing zone 5 (FIG. 4).

Figure 5:
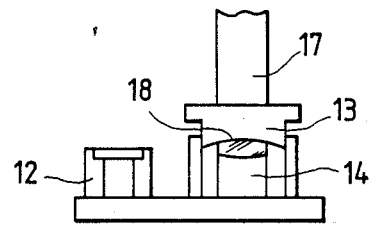

Then the pressing rod 17 is energized to press the upper mold die 13 with a predetermined pressure thereby press molding the material 15 (FIG. 5).

Then the pressing operation of the pressing rod 17 is terminated, and the pushing cylinder 51 is activated to move the pallet 11, with the upper mold die 13 being placed on the lower mold die 14, from the pressing zone 15 to a position close to the exit thereof. Subseqnently said pallet 11 is pulled to the second transfer chamber 22 by means of the pulling cylinder 52, and is transferred to the third transfer chamber 23 through a transfer path 25, by means of the pushing cylinder 53.

Subsequently the pallet 11 is pushed toward the molded product take-out chamber 7 by the pushing action of the pushing cylinder 54. However, because of the present of other pallets 11 in front of the above-mentioned pallet 11, the molded product 18 supported between the upper and lower mold dies 13, 14 is gradually cooled through the annealing zone 6 by the repetition of the above-explained operation.

The pallet 11 moved to the exit of the annealing zone 6 is transferred to the molded product take-out chamber 7 by means of the pulling cylinder 56.

Then the lifting hand 20 is activated to remove the upper mold die 13, and the molded product is taken out by the automatic hand 19. After the removal of the molded product, the pallet 11 is transferred by the pushing cylinder 55 through the return path 26 to the material intake chamber 1, for repeating the above-described procedure.

In the course of heating of the material for the optical element to a molding temperature, if said material is in contact with the surface of the mold dies or in the vicinity thereof, there may result a reaction between the molding material and the die surface before the press molding, thereby eroding the surface of the mold. Particularly if the material is lead-containing glass, even when the glass material is separated from the die surface by about 1 mm, the lead in the glass material is deposited on the die surface after the heating, thereby causing rapid erosion of the die surface and deteriorating the precision of the die surface.

In the present invention, the heating zone 2 and the pressing zone 3 are formed as a linear molding line, and the annealing line 6 is positioned parallel to said molding line. In addition, rapid cooling means for the press molded product is provided in the connecting path 25 between said molding line and the annealing zone.

The above-explained structure enables to place a cooling step close to the pressing step, contrary to the conventional structure, and said cooling means allows to reduce to the entire production time.

In the following there will be described a first embodiment of rapid-cooling step described above, with reference to FIG. 15, which shows a schematic cross-sectional view along a line A—A in FIG. 1A.

Figure 15:
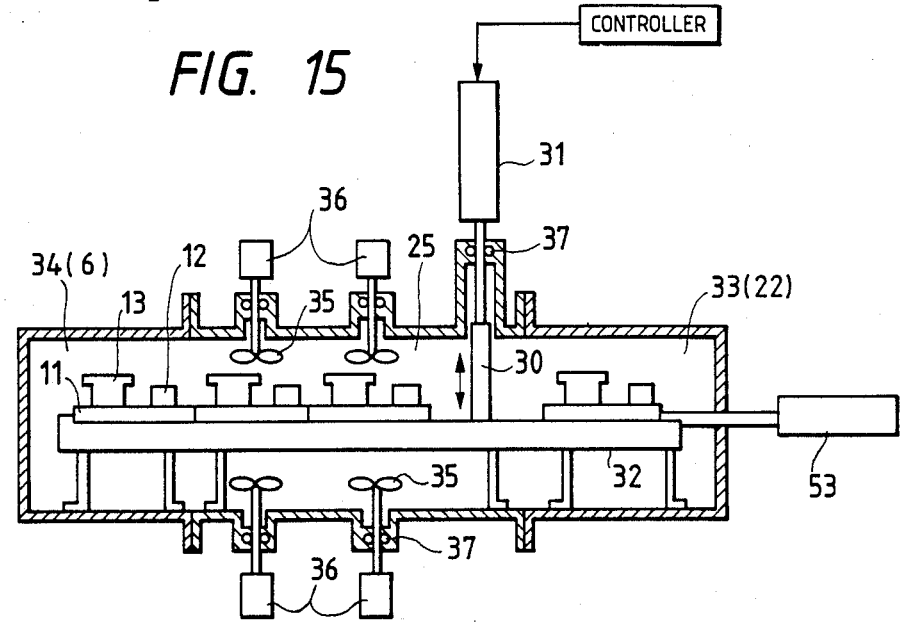
FIGS. 15 and 16 are views showing cooling means in a connection path 25.

In FIG. 15, 33 indicates a molding chamber corresponding to the aforementioned second transfer chamber 22, into which the high-temperature gas may flow from the heating zone 2. 34 indicates a molding chamber corresponding to the annealing zone 6.

In certain positions of the transfer path 25, there are provided fans 35 connected to motor 36, for introducing the cooling gas of the annealing zone 6 into the transfer path 25.

At the boundary between the transfer path 25 and the second transfer chamber 22, there is provided a shutter 30, which is connected to a cylinder 31 linked with the controller C shown in FIG. 7 and is opened or closed by said cylinder 31 in synchronization with the pushing operation of the second pushing cylinder 53. More specifically, the shutter 30 is opened or closed respectively when the piston rod of the cylinder 53 is extended or retracted. In this manner the intrusion of the high-temperature gas of the molding line is minimized.

It is desirable to provide sufficient seals in the sliding portions between said fans 35 or the cylinder 31 with the walls of the transfer path 25, in order to maintain the hermeticity of the path.

In the above-described structure, the fans 35 cause the circulation of the gas in the transfer path 25, for cooling the molded products 18 passing through the transfer path 25, thereby alleviating the burden of cooling in the annealing zone 6 and reducing the sojourn time required therein.

In the following there will be explained a second embodiment of the transfer path 25 with reference to FIG. 16, which shows a schematic cross-sectional view along a line A—A in FIG. 1.

In the present embodiment, the cooling gas is forcedly introduced from the outside. As shown in FIG. 16, the cooling gas from the annealing zone 6 is sucked by a blower 63 provided outside the furnace from an outlet 64 provided below the annealing zone 6, then cooled by cooling means 62, and introduced into the transfer path 25 through a pipe 60 and nozzles 61.

Other structures of the present embodiment are same as those in the aforementioned first embodiment. The above-described structure realizes rapid cooling of the molded products 18 passing through the transfer path 25, thereby alleviating the burden of cooling in the annealing zone 6 and reducing the sojourn time required in the annealing zone 6.

Figure 17:
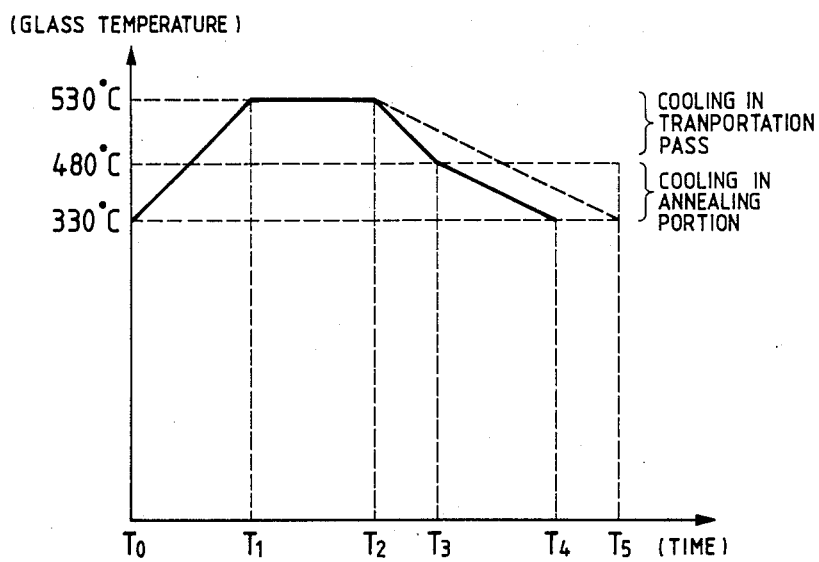
FIG. 17 is a temperature cycle chart of said cooling means.

In the following there will be explained the time-dependent change of glass temperature in various seeps in the apparatus of the present embodiment, with particular reference to FIG. 17, which shows a time-temperature curve in case of forming a convex lens with a diameter of 20 mm and a thickness of 2 mm, utilizing optical glass SF8 (glass transition point Tg=443° C., specific gravity 4.22) which is commonly employed in the camera lenses. In FIG. 17, T1-T5 indicate the periods of different steps.

The glass material 16 loaded on the material support member 12 in the material intake chamber 1 is heated (T0-T1) in the heating zone 2, and, after reaching the pressing temperature (530° C.), it is transferred to the lower mold die 14. It is then subjected to press molding with the upper mold die 13 thereon (T1-T2). In subsequent passing through the transfer path 25, the glass material is rapidly cooled to 480° C. by the aforementioned cooling means (T2-T3), and is further cooled to the take-out temperature (330° C.) in the annealing zone 6 (T3-T4).

If the cooling is solely conducted in the annealing zone, the cooling from the pressing temperature 530° C. to the take-out temperature 330° C. will require a period from T2 to T5, as indicated by a broken line, involving an additional time T4-T5.

As explained in the foregoing, the apparatus of the present embodiment allows to reduce the time required for annealing of the press molded products, thereby significantly reducing the entire molding time. It is therefore rendered possible to reduce the number of pallets, and that of the mold dies, circulating in the molding path, and thus reduce the manufacturing cost.

In the aforementioned prior art for producing optical elements, it has been difficult to detect whether the glass material is heated to a desired temperature in the heating zone, or to detect whether the molded product is annealed to a suitable temperature for taking out.

According to a feature of the present invention, it is rendered possible to improve the accuracy of temperature measurement utilizing a fact that the glass material and the mold dies are transported on the pallet 11.

Figure 18:
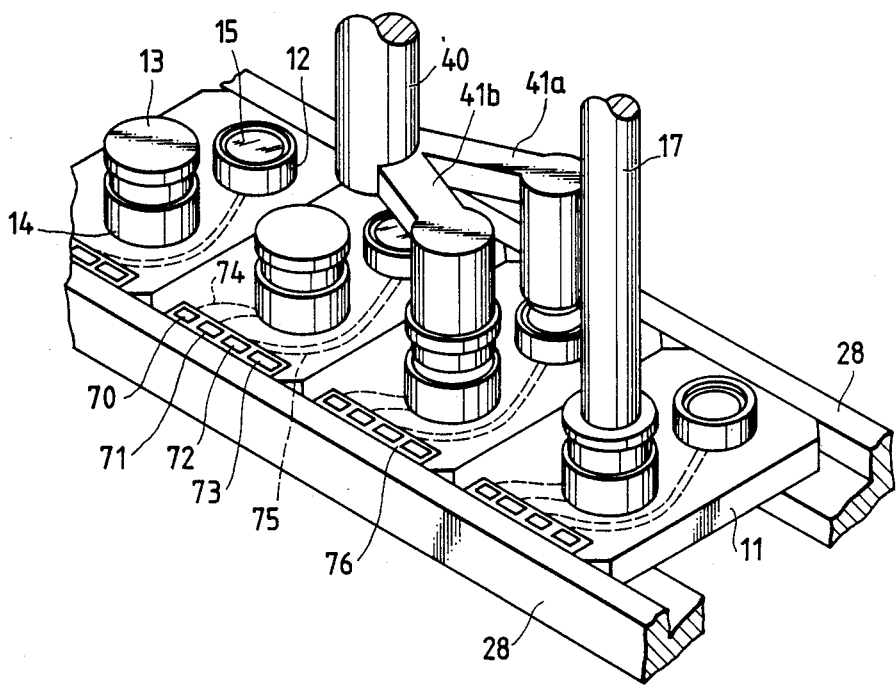
FIG. 18 is a schematic view showing the principle of temperature measurement.
Figure 19:
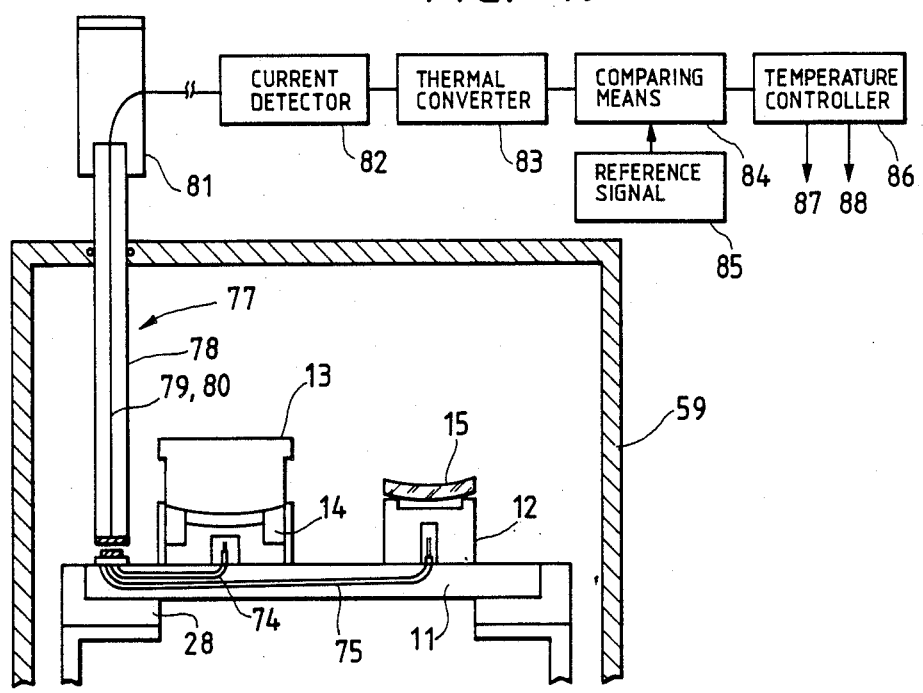
FIG. 19 is a schematic view showing the principle of temperature measurement control.
Figure 20:
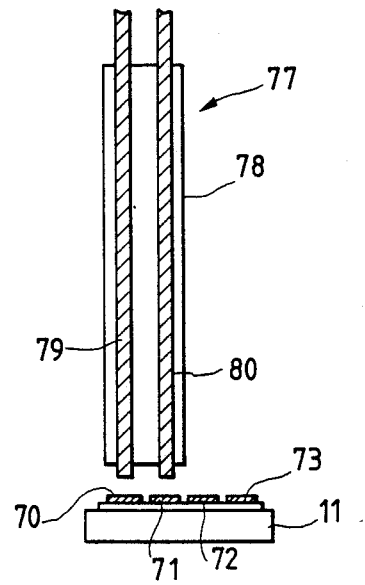
FIG. 20 is a schematic view showing the state of temperature measurement.

FIGS. 18 to 20 illustrate such embodiment, in which there is provided means for measuring the temperature of the pallet passing through the heating zone together with the material for forming the optical element and that of said material, said measuring means comprises means incorporated in said material support member for determining the temperature of said material, and means for measuring the detection signal from said detecting means by way of said material support member.

In the above-explained structure, the detection signal, detected from said material for forming the optical element, is measured through the material support member transported through the molding process, thereby determining the temperature of said material. Therefore, even when the material is transported through the molding process, the temperature of the material can be measured continuously without the difficulty encountered in the conventional apparatus. It is thus rendered possible to determine the temperature of the material at an arbitrary position in the molding process, to identify whether the material has been heated to the predetermined pressing temperature, and to provide the material with an optimum pressing condition, thereby producing optical element of high precision.

FIG. 18 is a perspective view of an area around the material transfer zone 3; FIG. 19 is a transversal cross-sectional view of said material transfer zone; and FIG. 20 is a schematic cross-sectional view of temperature detecting means shown in FIG. 19.

In the present embodiment, the temperature detecting means for the material 15 is positioned in the material transfer zone 3 or in the vicinity thereof in order to enable detection whether the glass material has been heated to a predetermined pressing temperature.

Along an upper edge of the pallet 11 in the longitudinal direction, there are provided two sets of electrodes consisting of alumel electrodes 70, 72 and chromel electrodes 71, 73. Said chromel and alumel electrodes can be adhered to the pallet 11 by means of a heat-resistant adhesive, such as Allon Ceramic. Lead wires of same materials as those of said electrodes, namely alumel wires and chromel wires, are connected to the lower mold die 14 and the material support member 12 through the pallet 11 to constitute thermocouples 74, 75. A probe 77 is suspended from the upper portion of the molding chamber 59, in the material transfer zone, corresponding to the moving path of said electrodes. Said probe has a ceramic member 78 bearing thereon an alumel wire 79 and a chromel wire 80 which are slightly extended beyond said ceramic member 78 at the lower end thereof and are connected, at the upper end thereof, to a measuring device provided outside the molding chamber 59. Said probe 77 is for example connected to a cylinder 81 and is rendered vertically movable. When the cylinder 81 is activated to lower the probe 77, the alumel and chromel wires 79, 80 protruding from the lower end are brought into contact with the alumel and chromel electrodes 70, 71 or 72, 73 on the pallet 11 whereby the temperature of the lower mold die 14 or the material support member 12 can be detected. It is therefore possible to measure the temperature of the upper and lower mold dies 13, 14 and the material support member 12 on each pallet 11, by forming the above-described electrodes on each pallet 11.

The detection signal from the alumel-chromel thermocouple 74 or 75 is transmitted to a current detector 82, a temperature converter 83 and a comparator 84 for comparison with a reference signal 85, and the temperature is regulated by the heaters 87, 88 by a current control with a regulator 86.

In the present embodiment, the temperature detecting means for the material 15 is positioned in the vicinity of the material transfer zone for detecting whether the material has been heated to a predetermined pressing temperature, but it is also possible to provide similar temperature detecting means in the vicinity of the molded product take-out chamber 7 for detecting whether the molded product 18 has been cooled to a predetermined take-out temperature and suitably regulating the heater 88 according to the detected value.

In the apparatus described above, the shape and dimension of the pallet varies according to the form of product to be molded. Therefore, when the transporting means for the pallets are composed of cylinders with a fixed stroke, and if the shape or dimension of the pallets, particularly the width thereof in the transporting direction becomes there will result a difference in the moving time of the pallets in the molding chamber, eventually leading to an excessively long or short sojourn time in the heating zone, or insufficient heating of the material.

The above-mentioned drawbacks can be resolved, according to the present invention, by rendering the stroke of the cylinders variable according to the change in the shape of the pallets.

In the following there will be described such embodiment with variable cylinder stroke, with reference to FIG. 21.

Figure 21:
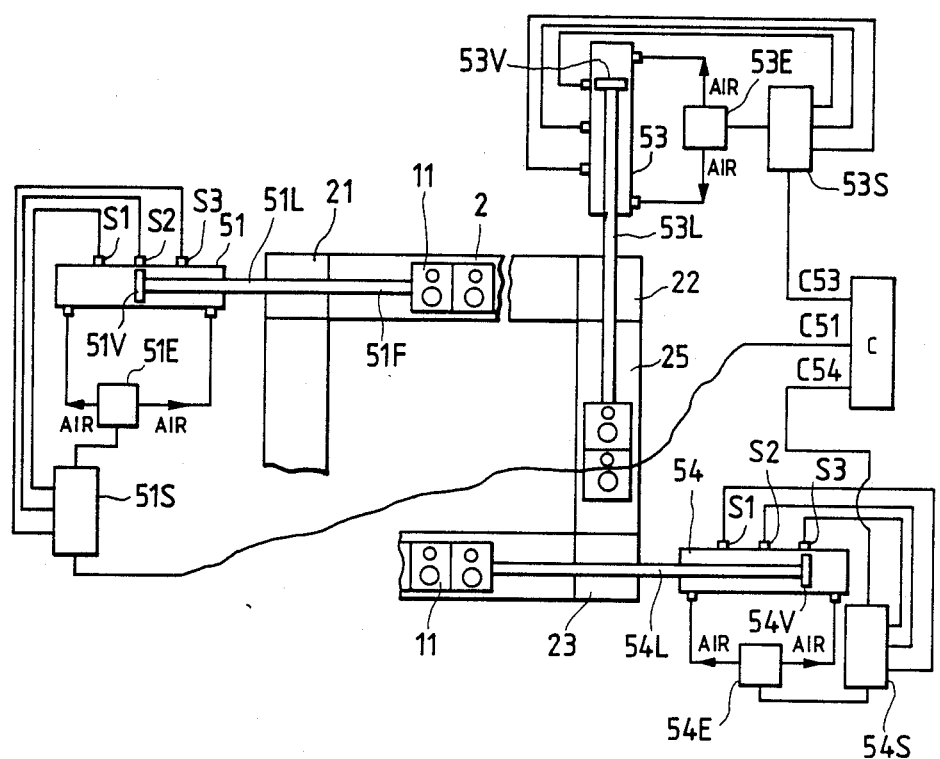
FIG. 21 is a schematic view showing the principle of stroke control for the cylinders.

FIG. 21 is a schematic plan view of the apparatus shown in FIG. 1, together with stroke control means for each cylinder. In FIG. 21, same components as those in FIG. 1 are represented by same numbers.

Since the control method is essentially same for all the cylinders, the following description will be concentrated on the pushing cylinder 51 for the first transfer chamber 21.

The pushing cylinder 51 is provided with a piston rod 51L, of which front end 51F is directed toward a pallet 11 in the heating zone 2, and of which the other end is provided with a piston valve 51V movable in said cylinder. The position of the piston rod 51L in the cylinder is detected by piston position sensors S1, S2, S3 provided in predetermined positions in said cylinder. The piston position signals from said sensors are supplied to a sequencer 51S, and then to the controller C for achieving position control. The signal from said sequencer 51S is further supplied to a solenoid valve 51E for supplying the cylinder 51 with controlled air, thereby moving the piston rod 51L.

In the actual process, the operators sets a stroke for each cylinder through the controller C, thereby operating the cylinders according to predetermined timings.

Said setting operation can be made, for example, by selecting piston position control signals C51, C53 and C54 in such a manner that the piston of the cylinder 51 assumes a position S1, that of the cylinder 53 assumes a position S3 and that of the cylinder 54 assumes a position S2. Thus the period of sojourn of the pallet 11 in each process step can be made equal to a predetermined value, by suitably selecting the stroke of each cylinder according to the width of said pallet in the transport direction thereof. Besides, since the stroke of the pushing cylinder 53 is made variable, there may be provided an empty pallet 11 in the return path 25 for prompt supply to the next cycle.

According to the present invention, as explained in detail in the foregoing, the glass material and the mold dies are separately placed on a pallet and are transported to the heating zone, and said glass material is transferred into the mold dies by transfer means, in front of the press molding step. Since the glass material is heated independently from the mold dies until immediately before the press molding, it is rendered possible to prevent the erosion resulting from the reaction between the glass material and the mold dies, thereby extending the service life of the mold dies and improving the surface precision of the molded lenses.

Also the process of the present invention in which the glass materials and the mold dies are transported by the pallets circulating through the intake chamber 1, heating zone, press molding zone, transfer path 25, annealing zone 6, take-out chamber 7 and return path 26, realizes continuous function of each step, thereby improving the production efficiency.

Also the pallet employed in the present invention is capable of presenting undesirable influence by heat transmission, by forming notches 11A, 11A on the faces opposed to the neighboring pallets or forming heat insulating materials on said faces, and by forming notches 11B, 11B on the sliding faces on the guide rails 28 or by forming heat insulating materials on said sliding faces, as shown in FIG. 1B.

Figure 14:
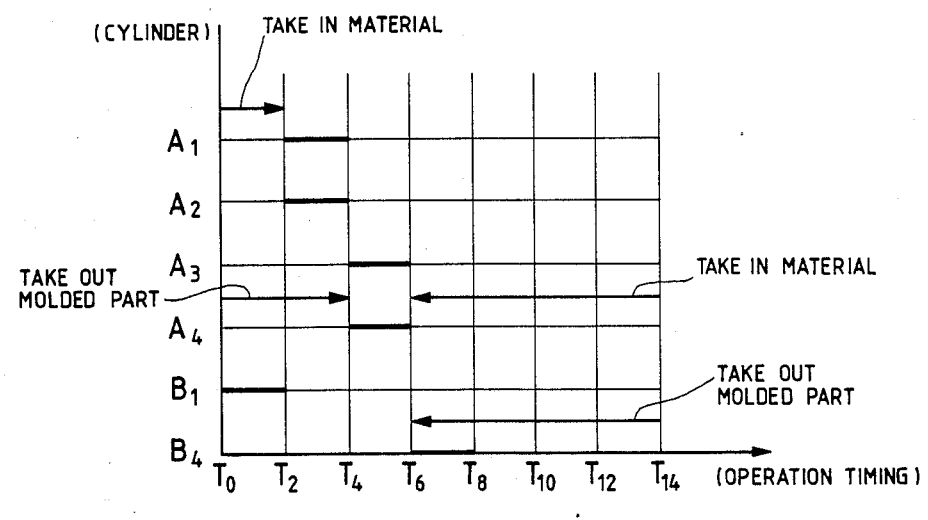
FIG. 14 is a timing chart showing the function of cylinders.

Also according to the present invention, there is provided, as already explained in relation to FIGS. 13 and 14, a return path 26 between the annealing zone and the molding zone, whereby the mold dies and the pallet can be immediately transferred to a next molding cycle without the removal of the mold dies and the pallet from the molding chamber and, therefore, without heat loss resulting from such removal.

Figure 16:
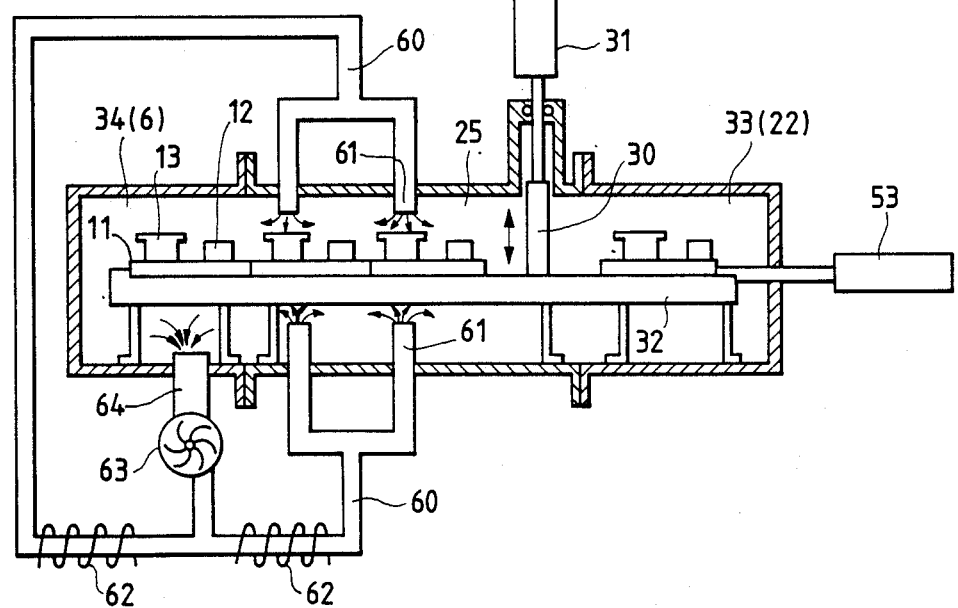

Also according to the present invention, as already explained in relation to FIGS. 15 to 17, the molded product is cooled by rapid cooling means prior to entering the usual annealing zone, so that the cooling time required for the molded product or the entire molding time is significantly reduced in comparison with that in the conventional apparatus. It is therefore rendered possible to reduce the number of the pallets or of the mold dies circulating in the molding chamber, and to reduce the production cost.

Furthermore, according to the present invention, the temperature of the material can be detected through the pallet moving through various steps. It is therefore possible to measure the temperature of the material at suitable positions in the molding process, and to select an optimum pressing condition by detecting whether the material has been heated to a predetermined pressing temperature, thereby achieving production of optical element of a high precision.

Furthermore, according to the present invention, the period of sojourn of the pallet in each step can be adjusted to a minimum necessary value, by regulating the stroke of the transporting means according to the shape of the pallet for supporting the material for molding. It is therefore made possible to reduce the entire cycle time, and for example to prevent the erosion of the mold dies by the glass component by reducing the period of sojourn in the heating zone.

Also the use of transporting means with variable stroke allows to reduce the number of pallets and of mold dies to a minimum necessary number.

Furthermore the present invention allows to execute the press molding after precise alignment of the pallet, for compensating the error resulting from thermal expansion of the pallets, as already explained in relation to FIGS. 1C to 1E.

We claim:

1. A glass press molding system, comprising:
    a molding die for molding glass material, said die having an upper mold die and a lower mold die;
    heating means for heating the glass material and the molding die;
    pressurizing means for pressurizing the glass material in said mold;
    a plurality of pallets for supporting the glass material and said mold die, said glass material and mold die being separately located on the pallet;
    transporting means for successively transporting said pallets each supporting said glass material and said mold die; and
    transferring means located between said heating means and said pressurizing means for transferring said glass material into said molding die prior to a pressing operation by said pressurizing means, wherein said glass material heated to a predetermined temperature by said heating means is transferred between said upper and lower mold dies and each pallet with the glass material inserted in the mold die is supplied to said pressurizing means.

2. A glass press molding apparatus according to claim 1, wherein said transferring means comprises a supporting member for
supporting said upper mold die and said glass material, with said supporting member putting said glass material on said lower mold die.

3. A glass press molding apparatus according to claim 1, wherein said pallets are transported into said heating means in a mutually contacted state, and each of said pallets has means for preventing heat transfer from adjacent pallets.

4. A glass press molding apparatus according to claim 3, wherein each said pallet is provided with notches on faces thereof opposed to adjacent pallets.

5. A glass press molding apparatus according to claim 1, further comprising means for indirectly measuring the temperature of said glass material transported in said heating means, wherein said measurement is conducted on said pallet by deriving the temperature of each said pallet and said mold die on said pallet.

6. A glass press molding apparatus according to claim 2, further comprising:
means for transporting by successively pushing the pallets each supporting said glass material and said mold die to said heating means and said pressurizing means; and
means for adjusting the position of each pallet transported into said pressurizing means by said transporting means.

7. A glass press molding apparatus according to claim 6, wherein said transporting means and said adjusting means rae composed of at least one cylinder for pushing said pallets, the operation direction of said cylinder being opposite to the direction of transport of said pallets.

8. A glass press molding apparatus according to claim 2, further comprising:
cooling means for cooling a product molded in said pressurizing means;
taking-out means for taking-out said cooled molded product, said taking-out means returning said molded product to a next cycle of molding.

9. A glass press molding apparatus according to claim 8, wherein said heating means and said pressurizing means are arranged linearly, an annealing step is positioned parallel to said heating and pressurizing means, and a quick quench means for quickly quenching the molded product is provided between said pressurizing means and said annealing means.

10. A glass press molding apparatus comprising:
heating means for heating glass material to be molded and a mold die for molding said glass material;
molding means for pressurizing and molding the glass material heated by said heating means;
pallets for supporting said glass material and said mold die thereon, wherein said pallets, each supporting said glass material and said mold die, are transferred to said heating means and said molding means; and
adjusting means for adjusting the heating time in said heating means by feeding interval of said pallets to said heating means.

11. Method for measuring a temperature of a glass press molding process comprising:
placing a glass material and a molding die onto a pallet;
transferring said pallet into a heating process;
heating said pallet to a predetermined temperature;
measuring the temperature of said molding die and said glass material, said temperature of said molding die and said glass material being respectively transmitted to thermal detection terminals provided on said pallet through a thermal transmitting path;
terminating said heating step when said detected temperature reaches the predetermined temperature;
transferring said glass material and said molding die to a pressurizing portion for molding said glass material into a molded article.

12. An apparatus for molding a glass material into an optical element, comprising:
a molding system having a glass material receiving portion, a heating portion, a press molding portion, a cooling portion, and a molded article taking-out portion, said molding system having a means to transfer a plurality of pallets supporting a glass material and a molding die to said each portions, said molding system having a transporting means for carrying the pallets from said molding article taking-out portion to said glass material receiving portion;
pulling out means for pulling out the pallets from said cooling portion to said molded article taking-out portion after completion of a cooling process; and
means for returning said pallets to said transporting means after removing the molded article from said pallets at said molded article taking-out portion.

13. An apparatus for molding a glass material into an optical element according to claim 12, wherein said pulling out means has cylinder means provided with, at an end portion thereof, a connecting means which is connectable/disconnectable with said pallets.

14. An apparatus for molding a glass material into an optical element, comprising:
a molding system having a glass material receiving portion, a heating portion, a press molding portion, a cooling portion, and a molded article taking-out portion, said molding system having means to transfer a plurality of pallets supporting a glass material and a molding die to each of said portions, wherein said molding system is provided with a transporting portion at which said pallets are sent from said molded article taking-out portion to said glass material receiving portion and rail means for guiding said pallets being transferred to said each portion, said rail means having a discontinuation portion for prohibiting an influence of heat transfer.

15. An apparatus for molding a glass material into an optical element, comprising:
a molding system having a glass material receiving portion, a heating portion, a press molding portion, a cooling portion, and a molded article taking-out portion, said transferring system having means to transfer a plurality of pallets supporting a glass material and a molding die to said portions;

means (54) for transferring said pallets from said press molding portion to said cooling portion after completion of a molding process;

means (55) for sending said pallets to said molded article taking-out portion after cooling at said cooling portion; and control means for simultaneously driving said transferring means (54) and said sending means (55).

16. Method for molding a glass material into an optical element, comprising:

preparing a plurality of pallets, each pallet having a molding die for press molding a glass material and a portion for supporting said glass material;

supplying the glass material to said glass material supporting portion of each said pallet;

transferring said pallet to a heating process;

heating said pallet with said molding die and said glass material by a single heat source;

transferring said heated pallets to a press molding process;

moving said heated glass material into said molding die during the step of said pallet being transferred from said heating process to said press molding process; and molding said molding material into said optical element.

17. Method for molding a glass material into an optical element, comprising:

heating a glass material and a molding die for press molding said glass material;

press molding said glass material heated by said heating process into a shape of the optical element by said molding die;

cooling said optical element molded by said molding die, said cooling process having two steps of cooling speeds between a molding temperature and a molding article taking-out temperature or an annealing temperature, wherein the first cooling speed from the molding temperature is greater than a secondary cooling speed subsequent to said first cooling.

18. A glass press molding apparatus, comprising:

a heating means;

a press molding means;

a pallet for transferring a glass material and a molding die for molding the glass material to said heating means and said press molding means, and having at least a temperature detecting portion for transmitting the temperature of said glass material;

a probe means for contacting with said temperature detecting portion;

means for converting the temperature detected by said probe into an electric signal; and a temperature controller for receiving the signal from said converting means and for outputting a control signal to said heating means.

* * * * *

UNITED STATES PATENT AND TRADEMARK OFFICE
CERTIFICATE OF CORRECTION

PATENT NO. : 4,913,718  Page 1 of 3
DATED : April 3, 1990
INVENTOR(S) : FUMITAKA YOSHIMURA, ET AL.

It is certified that error appears in the above-identified patent and that said Letters Patent is hereby corrected as shown below:

Column 1

Line 57, "However" should read --However,--.

Column 4

Line 5, "Palletes 11" should read --Pallets 11--.

Line 16, "13, 14a" should read --13a, 14a--.

Line 18, "placed" should read --placed on--.

Line 20, "guide rails 2, 28" should read --guide rails 28, 28--.

Column 5

Line 3, "neighboring pallet 22" should read --neighboring pallet P2--.

Line 4, "engaging member 25b" should read --engaging member 52b--.

Line 23, "engaging member 25b" should read --engaging member 52b--.

Line 48, "assumed" should read --assumes--.

Line 55, "center B-B" should read --center B-B'--.

Column 6

Line 41, "indicate" should read --indicates--.

Line 42, "indicate" should read --indicates--.

Line 60, "tranfer" should read --transfer--.

UNITED STATES PATENT AND TRADEMARK OFFICE
CERTIFICATE OF CORRECTION

PATENT NO. : 4,913,718  Page 2 of 3
DATED : April 3, 1990
INVENTOR(S) : FUMITAKA YOSHIMURA, ET AL.

It is certified that error appears in the above-identified patent and that said Letters Patent is hereby corrected as shown below:

Column 9
    Line 33, "conducted" should read --be conducted--.
    Line 48, "15" should read --5--.  "Subseqnently" should read --Subsequently--.
    Line 56, "present" should read --presence--.

Column 10
    Line 16, "pressing zone 3" should read --pressing zone 5--.

Column 11
    Line 9, "seeps" should read --steps--.

Column 13
    Line 1, "becomes" should read --changes--.
    Line 34, "operators" should read --operator--.

Column 14
    Line 2, "presenting" should read --preventing--.

UNITED STATES PATENT AND TRADEMARK OFFICE
CERTIFICATE OF CORRECTION

PATENT NO. : 4,913,718
DATED : April 3, 1990
INVENTOR(S) : FUMITAKA YOSHIMURA, ET AL.

It is certified that error appears in the above-identified patent and that said Letters Patent is hereby corrected as shown below:

Column 15
    Line 10, Close up right margin.
    Line 40, "rae" should are --are--.
    Line 53, "annealing step" should read --annealing means--.

Column 16
    Line 17, "temperature;" should read --temperature; and--.

Signed and Sealed this

Eighth Day of September, 1992

Attest:

DOUGLAS B. COMER

*Attesting Officer*      *Acting Commissioner of Patents and Trademarks*